United States Patent [19]
Renaud et al.

[11] Patent Number: 6,167,154
[45] Date of Patent: Dec. 26, 2000

[54] IMAGE PROCESSING APPARATUS AND SECONDARY LINE FEATURE INDICATIVE VALUE CALCULATING DEVICE

[75] Inventors: Miel Renaud; Koichi Hashimoto, both of Tokyo, Japan

[73] Assignee: RISO Laboratory, Inc., Tokyo, Japan

[21] Appl. No.: 09/055,468

[22] Filed: Apr. 6, 1998

[30] Foreign Application Priority Data

Apr. 7, 1997 [JP] Japan ..................................... 9-088041
Mar. 13, 1998 [JP] Japan .................................. 10-062737

[51] Int. Cl.⁷ ...................................................... G06K 9/34
[52] U.S. Cl. ............................................. 382/174; 382/190
[58] Field of Search ..................................... 382/173, 174, 382/176, 190, 193, 202, 252; 358/462

[56] References Cited

U.S. PATENT DOCUMENTS 5,926,564  7/1999  Kimura ..................................... 382/174
5,987,221  11/1999  Bearss et al. ............................ 382/176

FOREIGN PATENT DOCUMENTS 01227573  9/1989  Japan .
03153167  7/1991  Japan .
08051538  2/1996  Japan .

*Primary Examiner*—Phuoc Tran
*Attorney, Agent, or Firm*—Nixon Peabody LLP; Donald R. Studebaker

[57] ABSTRACT

When an original wherein a plurality of binary image areas in different density or the like coexist is printed by stencil making, tone characteristics of a tone image area are preserved and blur or extinction of a faint letter, or smear of a letter written on a dark background in a binary image area is prevented from occurring and print without incongruity due to density different is obtained. An image processing apparatus comprises first analyzing device which analyzes whether a target pixel is in a binary image area or a tone image area, second analyzing device which calculates a secondary line feature indicative value regarding density difference between a line and its background when the target pixel is composing a line in a thickness equal to or less than a certain value, judging device which judges the degree or likelihood of weather the target pixel is in a binary image area or a tone image area by a grade, based on analysis result by the first analyzing device and the secondary line feature indicative value, adopted-density conversion device which converts density of the target pixel based on the judgment result, and binary conversion device which upon necessity converts the target pixel having been density-converted into binary data.

7 Claims, 13 Drawing Sheets

////// : LATEST PIXEL DATA

FIG. 8A
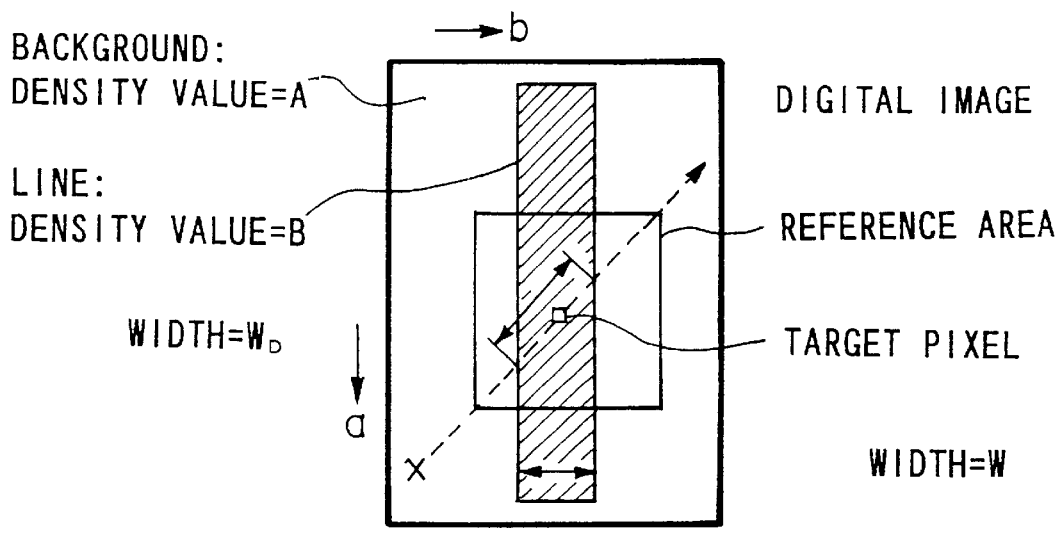
FIG. 8B
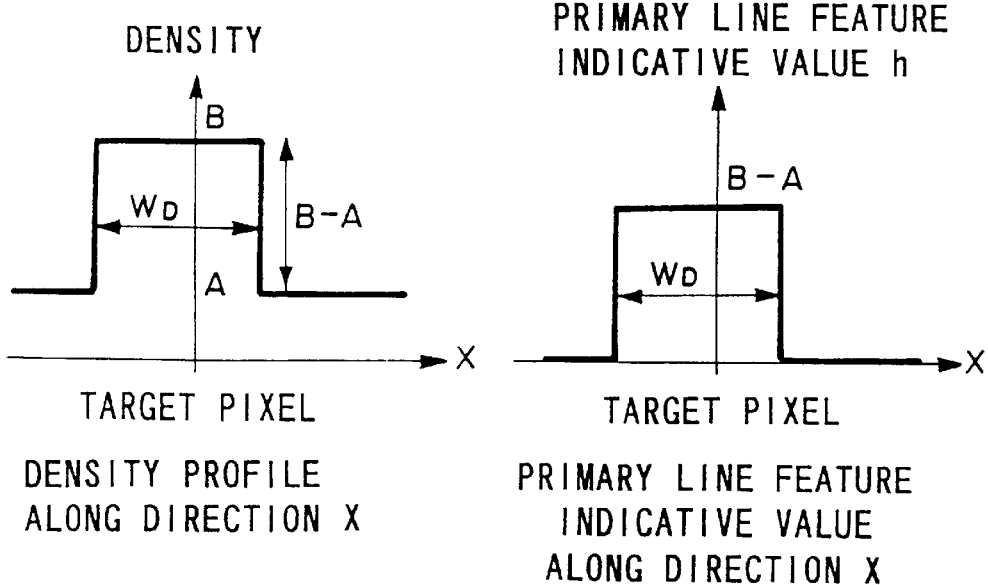
DENSITY PROFILE ALONG DIRECTION X
FIG. 8C
PRIMARY LINE FEATURE INDICATIVE VALUE ALONG DIRECTION X FIG. 9A
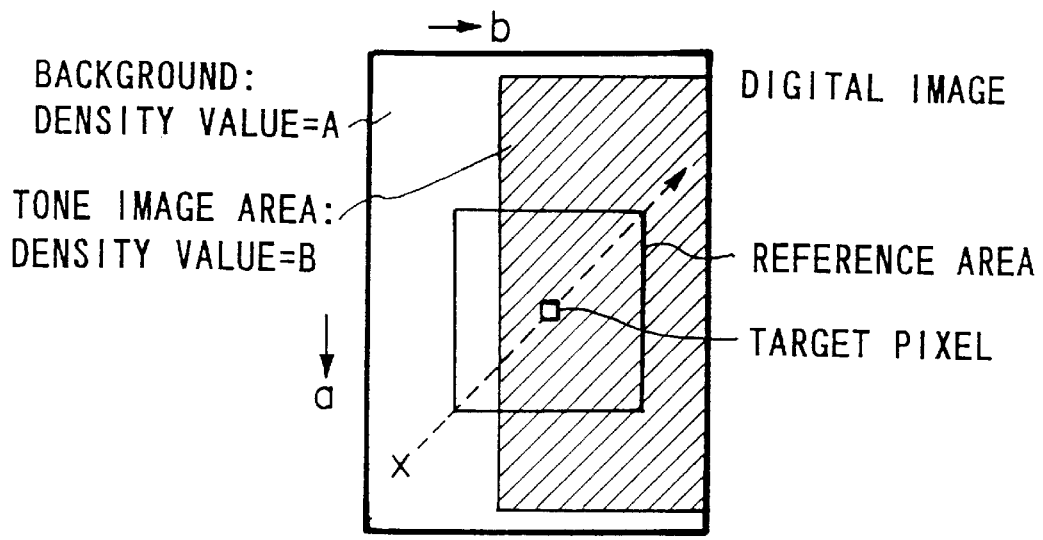
FIG. 9B
FIG. 9C
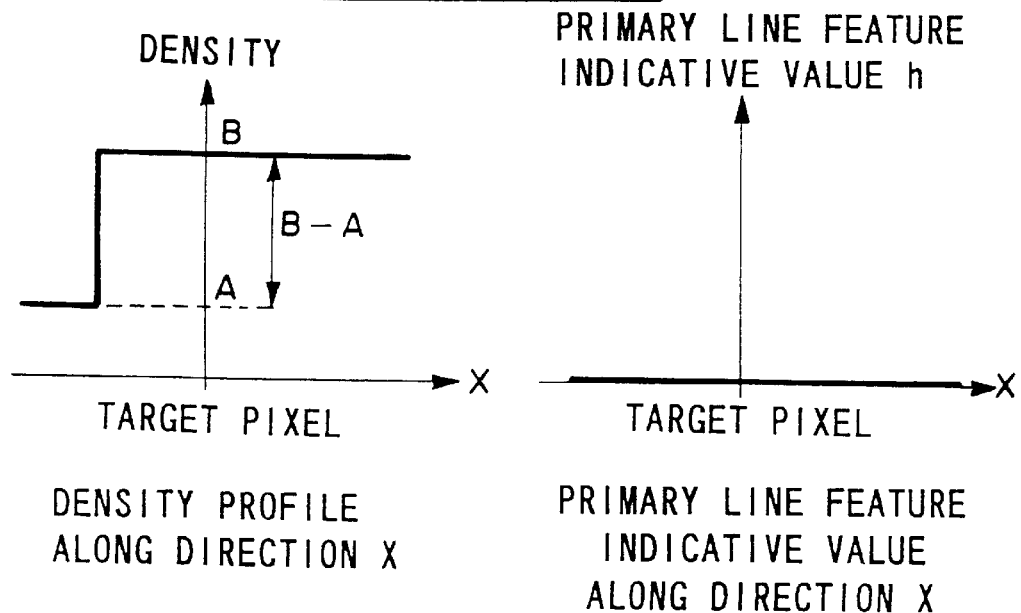

FIG.13
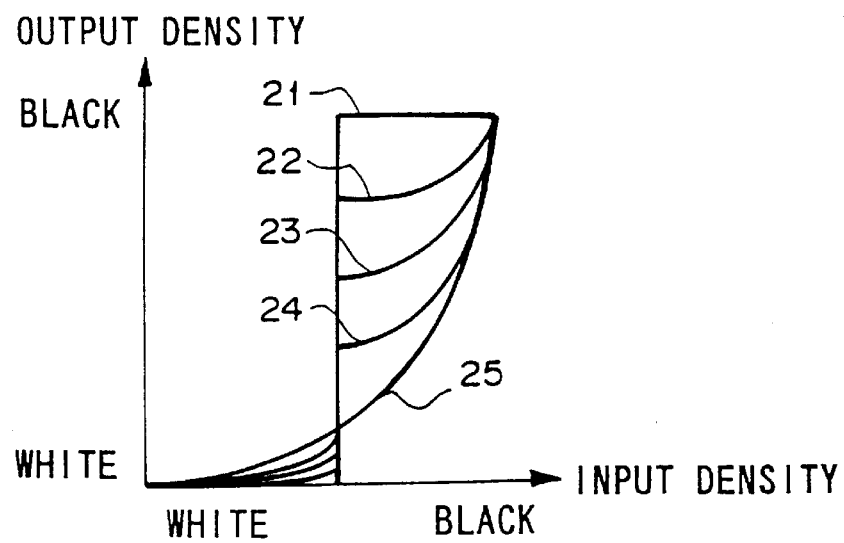
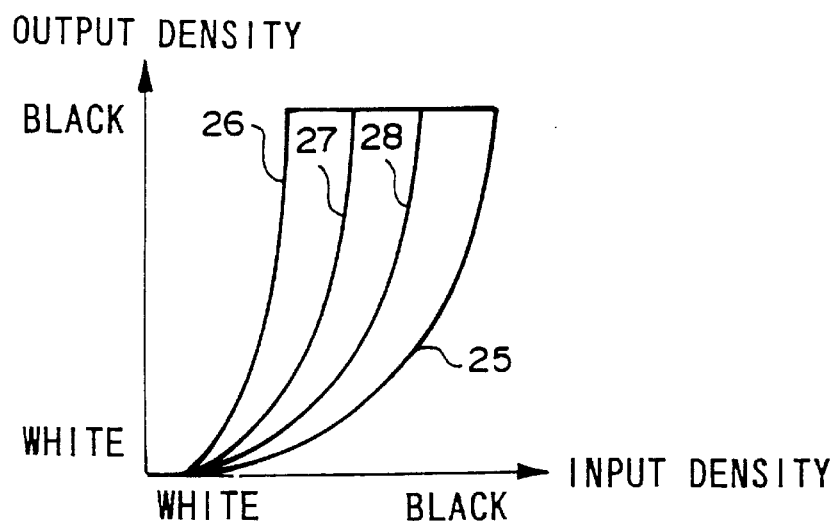
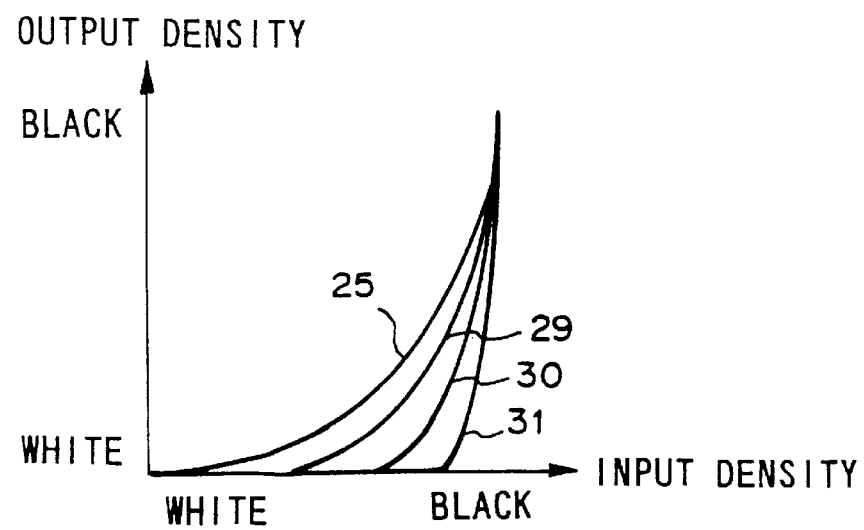

IMAGE PROCESSING APPARATUS AND SECONDARY LINE FEATURE INDICATIVE VALUE CALCULATING DEVICE

BACKGROUND OF THE INVENTION

1. Field of the Invention

The present invention relates to an image processing apparatus which reads an image on an original and outputs the digital image data having been read as binary data after carrying out image processing thereon. More specifically, the present invention relates to an image processing apparatus used for a stencil-making apparatus (a digital printer) which carries out perforation on thermosensitive stencil paper, or to an apparatus (a digital copier) which copies on paper or thermal paper a latent image formed on a photosensitive material by using electrophotography.

2. Description of the Related Art

When an original in which binary images such as characters or drawings and tone images such as photographs coexist is output as binary data by using an image processing apparatus such as the one described above, it is necessary to obtain an optimal result that the binary image areas are binary-converted to either a maximal density value or a minimal density value by using an appropriate single threshold value, and density conversion to an appropriate density is carried out for the tone image areas by considering characteristics of input/output devices. For this purpose, it is necessary to judge whether each portion of an image is a binary image area or a tone image area and to separate the binary image areas from the tone image areas.

To tell a binary image area from a tone image area, several methods have been used. One method divides an image into blocks of n×n pixels and judges on each block based on the result of feature extraction carried out thereon (see Japanese Unexamined Patent Publn. No. 3(1991)-153167, for example) (hereinafter this method is called "method A"). Another method carries out the feature extraction on a target pixel and its surrounding pixels and judges on each pixel by using the feature extraction result (see Japanese Unexamined Patent Publn. No. 1(1989)-227573, for example) (hereinafter this method is called "method B").

In method A, since judging is carried out on each block, there are some problems such as misjudgment or appearance of a block shape at a boundary between a binary image area and a tone image area. When method B is adopted, an effect caused by misjudgment is not so conspicuous as in method A. However, a difference in density between a misjudged portion and a portion properly judged is created, which leads to incongruity of an image.

Furthermore, it is difficult to tell a drawing in thick solid lines or a flatly blackened portion in a binary image area from a high density portion in a tone image area. If a judgment parameter is adjusted so that they can be distinguished, there will be a flattened density portion in a photograph image. On the other hand, if the judgment parameter is adjusted so that a high density portion of a photograph can be distinguished from a tone image, the density of a thick solid line drawing or a flatly blackened portion will become low.

Therefore, as means for alleviating the problems in methods A and B, Riso Kagaku Corp. has proposed a method (see Japanese Unexamined Patent Publn. No. 8(1996)-51538, hereinafter called "method C") to tell a binary image area from a tone image area, wherein an "edge pixel" (a pixel with a sharp density gradient) and its surrounding are detected, the edge pixel and high density pixels in its surrounding are then judged to be in a binary image area, and, in the case of misjudgment such as the edge pixel having been judged as a contour pixel in a tone image area, an appropriate density conversion curve is selected among a plurality of density conversion curves which interpolate a tone image density conversion curve and a binary image density conversion curve in order not to create incongruity of an image as the distance between a binary image pixel to the edge pixel becomes larger.

In method C, two conditions, that is, the target pixel is close to the edge pixel and is in high density, should be met for the target pixel to be judged as a pixel in a binary image area. However, binary image areas wherein density varies in a background or between characters may coexist on an original, such as in the case where hand written letters lie next to a piece of newspaper cut and pasted on an original, or a document printed by a laser beam printer accompanies a seal (letters in red seal-ink) on the document. In such a case, as well as in the case where tone image areas such as photographs coexist on an original with the background or letters, faint letters (especially letters in pencil or red seal-ink) may be misjudged as a tone image area rather than a binary image area, since the density gradient thereof is not very sharp and the density is low. As a result, the faint letters may disappear on print.

SUMMARY OF THE INVENTION

The present invention has been created based on the consideration of the problems described above. The object of the present invention is to provide an image processing apparatus which can preserve characteristics of a tone image area on an original wherein binary image areas with different character density coexist or a tone image area such as a photograph also coexist therewith, and which can solve the problems of blur or extinction of faint letters or the like by outputting an image density signal in order to appropriately sharpen the contrast of letters even when the density thereof varies.

The image processing apparatus of the present invention comprises first analyzing means which analyzes whether a target pixel is likely to be in a binary image area or a tone image area;

second analyzing means different from said first analyzing means, which analyzes whether the target pixel is likely to be in a binary image area or a tone image area by calculating, based on reference image data around the target pixel, a plurality of degrees of at least either a peak or a trough of the target pixel density as primary line feature indicative values along a plurality of lines in different directions and passing the target pixel, and by calculating a secondary line feature indicative value based on the primary line feature indicative values having been calculated; and density conversion means which converts the density of the target pixel based on the analysis result by said first and the second analyzing means.

The "first analyzing means" herein referred to is to improve judgment effectiveness regarding the likelihood of a binary image area or a tone image area, in combination with the second analyzing means. For example, the first analyzing means may be analyzing means which analyzes the likelihood of a binary image area or a tone image area, based on image feature indicative values in response to edge information regarding edge sharpness of the target pixel, distance from the target pixel to a closest edge pixel, and thickness of a line (a high density vertical line), as disclosed in Japanese Unexamined Patent Publn. No. 8(1996)-51538.

"A plurality of degrees of . . . a peak or a trough of the target pixel density" means, in the case where the target pixel is a pixel composing a line, indication expressing the degree of density difference (shown by a density profile) between the line and its background.

When a pixel around a target pixel has a lower density value than the value of the target pixel, in other words, the density profile thereof rises and then descends, it is called "a peak", while a pixel around a target pixel has a higher density value than the value of the target pixel, in other words, the density profile thereof descends and then rises, it is called "a trough".

The second analyzing means of the present invention is to show the degree described above as the magnitude of an absolute value of density difference between the target pixel and the reference image around the target pixel. It is preferable that the second analyzing means determines in advance which place in the absolute value of the primary line feature indicative values should be extracted as the secondary line feature indicative value, in connection with a predetermined angle and the number of lines in different directions, and outputs the determined primary line feature indicative value as the secondary line feature indicative value of the target pixel. In this case, when pixels on the line of said reference image data are divided into two groups which catch the target pixel therebetween, it is preferable that the degree shows the magnitude of the absolute value of the density difference between the target pixel and one of the group of pixels with the smaller density difference from the density of the target pixel.

The "predetermined angle" means the angle of a portion of a tone image area which is situated at a corner of the tone image area and not desired to be detected as a line.

The secondary line feature indicative value is calculated according to Equation (1) below:

$$H(a, b) = \underset{x=1,4}{2nd\_Max\_Abs}\{hx(a, b)\} \quad (1)$$

where,

2nd_Max_Abs(E) indicates (either one of) element with a second-largest absolute value among all elements in set E.

$$hx(a, b) = Max\_Abs\{Peak \underset{ux}{\to} (a, b), Trough \underset{ux}{\to} (a, b)\} \quad (2)$$

where, $$Max\_Abs(X, Y) = \begin{cases} X \text{ if } |X| \geq |Y| \\ Y \text{ else} \end{cases}$$

$$pkx(a, b) = Peak \underset{ux}{\to} (a, b) \quad (3)$$

$$= Max\left(0, f(a, b) - Max\begin{pmatrix} \underset{k \in S+}{Min}\{f(a + k \cdot uxa, b + k \cdot uxb)\}, \\ \underset{k \in S-}{Min}\{f(a + k \cdot uxa, b + k \cdot uxb)\} \end{pmatrix}\right)$$

-continued $$trx(a, b) = Trough \underset{ux}{\to} (a, b) \quad (4)$$

$$= Min\left(0, f(a, b) - Min\begin{pmatrix} \underset{k \in S+}{Max}\{f(a + k \cdot uxa, b + k \cdot uxb)\}, \\ \underset{k \in S-}{Max}\{f(a + k \cdot uxa, b + k \cdot uxb)\} \end{pmatrix}\right)$$

where, $$x = 1, 2, \ldots, 4: \ \vec{ux} = uxa\ \vec{i} + uxb\ \vec{j} = \begin{pmatrix} uxa \\ uxb \end{pmatrix} \text{ and}$$

$$\vec{u1} = \begin{pmatrix} 1 \\ 0 \end{pmatrix}, \vec{u2} = \begin{pmatrix} 1 \\ 1 \end{pmatrix}, \vec{u3} = \begin{pmatrix} 0 \\ 1 \end{pmatrix}, \vec{u4} = \begin{pmatrix} -1 \\ 1 \end{pmatrix}$$

$$S+ \subset [1, 2, \ldots, N]: \ S- \subset [-1, -2, \ldots, -N];$$

N: positive integer

It is preferable that the density conversion means of the present invention converts density by selecting an appropriate density conversion curve among a plurality of density conversion curves.

It is more preferable that the "plurality of density conversion curves" include density conversion curves which smoothly transform basic density conversion curves so that brighter and/or darker output is produced as a whole.

The image processing apparatus of the present invention may comprise binary conversion means which carries out binary conversion by an error diffusion method on the target pixel having been density-converted.

The image processing apparatus of the present invention may not comprise the first analyzing means and analyze whether a target pixel is likely to be in a binary image area or a tone image area by calculating only the secondary line feature indicative value. A secondary line feature indicative value calculating device of the present invention exists for this purpose, and calculates the degree of at least either a peak or a trough of a target pixel density as a primary line feature indicative value along a plurality of lines in different directions and passing the target pixel, based on reference image data around the target pixel, and calculates a secondary line feature indicative value based on the results of the calculated primary line feature indicative value.

The image processing apparatus of the present invention comprises the second analyzing means (the secondary line feature indicative value calculating device) which analyzes whether a target pixel is in a binary image area or a tone image area based on the secondary line feature indicative value showing the characteristics of the primary line feature indicative value having information regarding the density difference, and the first analyzing means which improves effectiveness of the judgment as to whether the target pixel is in a binary image area or a tone image area, in combination with the second analyzing means. This configuration allows density conversion based on the analysis result. Therefore, more appropriate density conversion can be carried out in addition to the effect obtained by a conventional image processing apparatus.

For example, a dark line can be darkened more, and a faint letter composed of thin lines or a faint pattern (a seal or the like) in a tone image area can be reproduced appropriately. Furthermore, a bright line can be brightened more, and a gap between character strokes can also be reproduced more clearly. Moreover, since a dark line can be darkened more and a bright line can be brightened more, it is avoidable that a mesh dot picture composed of fine dots becomes too dark or too faint.

In this manner, when an original wherein a plurality of binary image areas with different density values or a binary image area and a tone image area coexist is printed through stencil-making, the print can be obtained with no blur or extinction of a faint letter in a binary image area or letters easy to distinguish from it's dark background, while preserving characteristics of a tone image area and causing no incongruity of the image due to density difference.

Furthermore, since the calculation of the secondary line feature indicative value is mainly based on a comparison operation, it becomes possible to configure the second analyzing means (the secondary line feature indicative value calculating device) with simple hardware.

BRIEF DESCRIPTION OF THE DRAWINGS

FIG. 8A is a diagram showing detection of a line by a primary line feature indicative value;

FIG. 8B is a diagram showing a density profile taken along direction X;

FIG. 8C is a diagram showing a primary line feature obtained by the density profile as shown in FIG. 9B;

FIG. 9A is a diagram explaining how the primary line feature indicative value works around an edge of a tone image area;

FIG. 9B is a diagram showing a density profile taken along direction X;

FIG. 9C is a diagram showing a primary line feature obtained by the density profile as shown in FIG. 9B;

FIG. 13 is a diagram showing density conversion curves used by the image processing apparatus.

DESCRIPTION OF THE PREFERRED EMBODIMENT

Hereinafter, an embodiment of an image processing apparatus according to the present invention will be described in detail with reference to the accompanying drawings.

Figure 1:
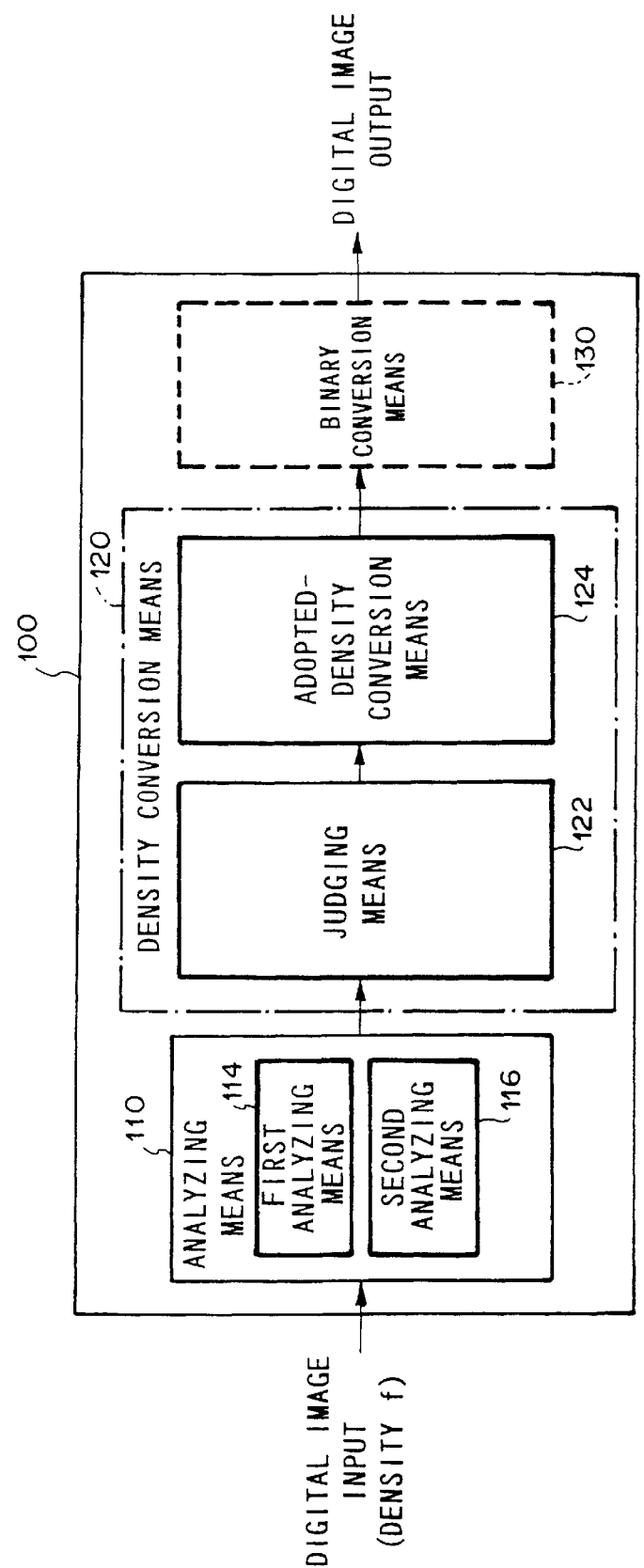
FIG. 1 is a block diagram showing a basic configuration of an image processing apparatus according to the present invention.
Figure 3:
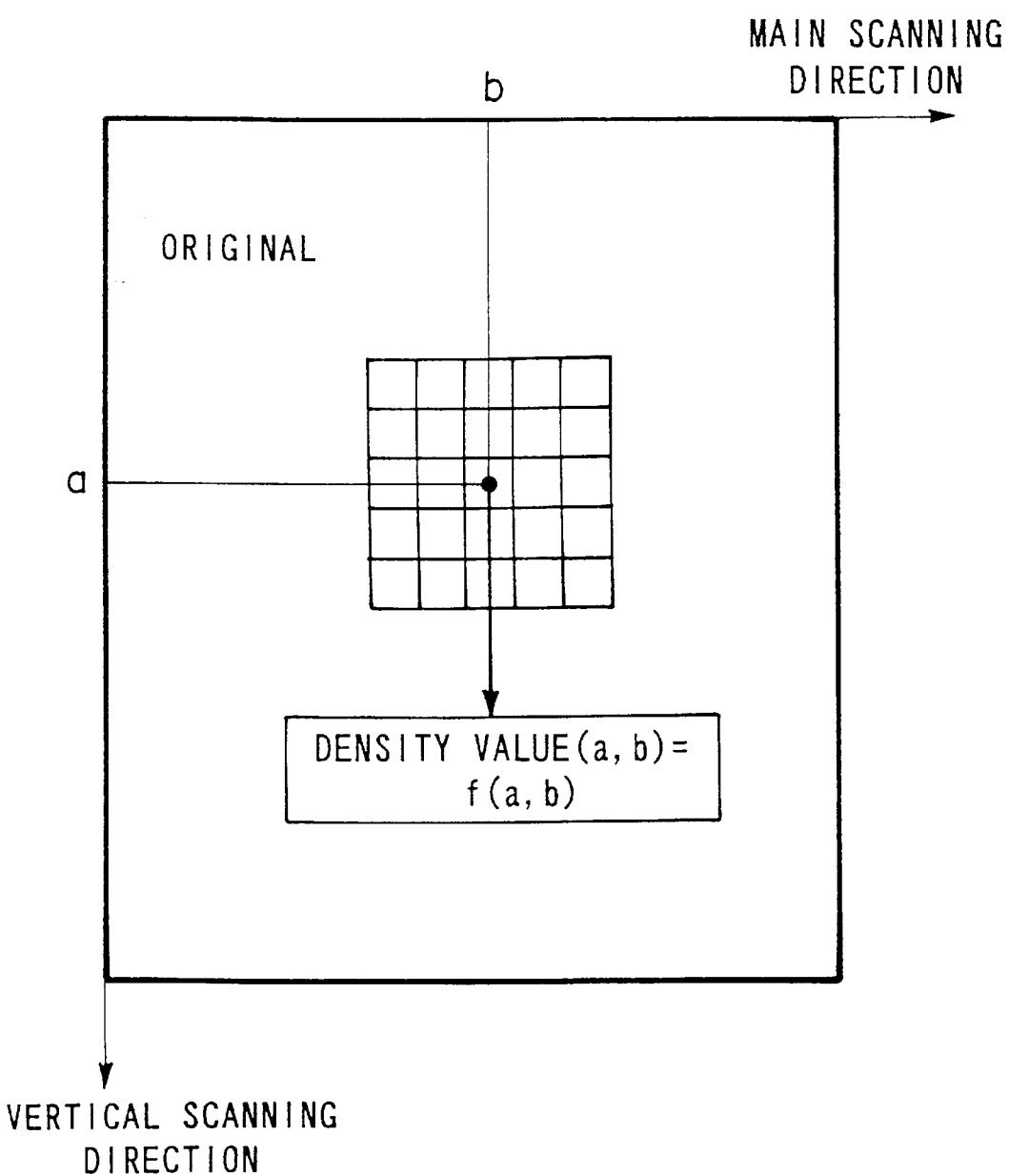
FIG. 3 is a diagram showing a relation between a pixel position and original-scanning directions.

FIG. 1 is a block diagram showing a basic configuration of the image processing apparatus of the present invention. An image processing apparatus 100 comprises original reading means which is not shown in FIG. 1. The original reading means reads, as shown in FIG. 3, image information of a pixel P(a, b), with b being a position of the pixel on an original along the main scanning direction and a being the position along the vertical scanning direction, as a digital image signal (a density signal) f(a, b) while sequentially scanning the original horizontally and vertically.

The image processing apparatus 100 comprises analyzing means 110 which analyzes whether each target pixel P is likely to be in a binary image area or a tone image area (hereafter also called "the state of the pixel P") for each density signal f(a, b) obtained by the original reading means, judging means 122 which judges the state of the pixel P by a grade ranging from a binary image to a tone image, based on the analysis result by the analyzing means 110, and density conversion means comprising adopted-density conversion means 124 which selects a desired density conversion curve from a set of density conversion curves according to the result of judgment regarding the state of the target pixel P by the judging means 122 and carries out density conversion processing based on the density signal f(a, b) of the target pixel P, according to the selected density conversion curve. Upon necessity, for example, in the case of an image processing apparatus for a stencil-making apparatus which carries out perforation on thermosensitive stencil paper, the image processing apparatus 100 may further comprise binary conversion means 130 shown by a broken line in FIG. 1 which carries out binary conversion on the pixel P having been density-converted.

Figure 2:
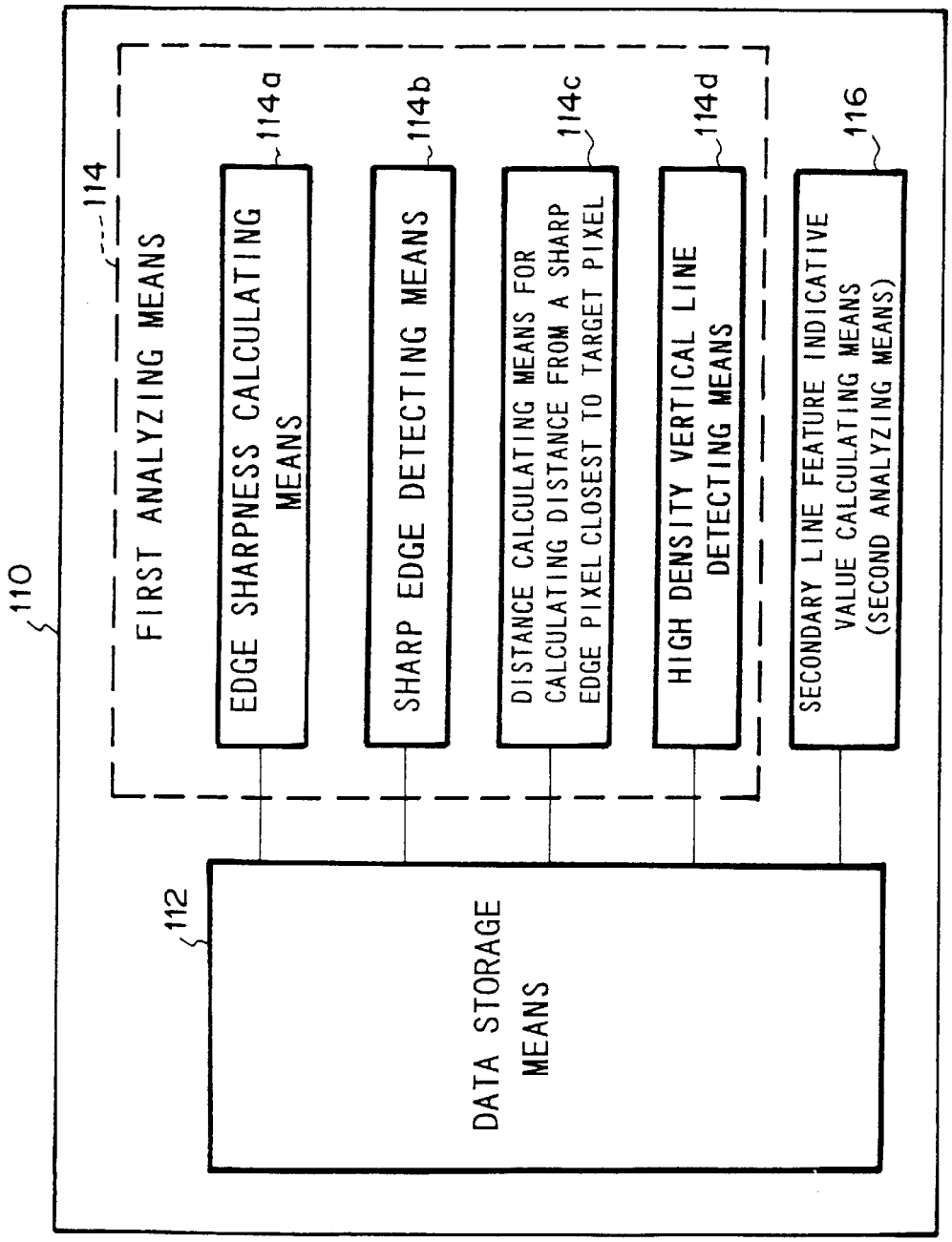
FIG. 2 is a block diagram showing the detail of analyzing means of the image processing apparatus.

FIG. 2 is a block diagram showing the detail of the analyzing means 110. The analyzing means 110 comprises data storage means 112 which stores the density signals f(a, b), first analyzing means 114 which analyzes whether the target pixel P is likely to be in a binary image area or a tone image area by using the image data provided by the data recording means 112, and second analyzing means 116 which calculates the degree of a peak and/or a trough of the target pixel density as a primary line feature indicative value hx thereof along a plurality of lines in different directions and passing the target pixel P, based on reference image data of pixels around the target pixel P, and analyzes whether the target pixel P is likely to be in a binary image area or a tone image area by calculating density difference H between a line and its background (hereinafter called "a secondary line feature indicative value") based on the calculation results. The first analyzing means 114 comprises edge sharpness calculating means 114a which calculates edge sharpness S at the target pixel P, sharp edge detecting means 114b which calculates a feature indicative value E representing judgment as to whether the edge sharpness S at the target pixel P exceeds a predetermined threshold value, that is, whether "a sharp edge exists at the target pixel P", distance calculating means 114c for calculating distance from a sharp edge pixel (hereinafter called "distance calculating means"), which calculates, when the sharp edge detecting means 114b detects a pixel with a sharp edge which is called a sharp edge pixel, a distance D from the sharp edge pixel closest to the target pixel P, and high density vertical line detecting means 114d which calculates a feature indicative value K representing judgment as to whether the target pixel P is a pixel in a dark vertical line in a width equal to or smaller than a predetermined width. The second analyzing means 116 is a secondary line feature indicative value calculating device which calculates, when the target pixel P is a pixel composing a line in a width equal to or smaller than a predetermined width, density difference H (the secondary line feature indicative value) between the line and its background. Hereinafter, the second analyzing means 116 is called a secondary line feature indicative value calculating means 116.

Operation of the image processing apparatus in the above configuration will be described next. Operation of the secondary line feature indicative value calculating means 116, which is characteristic to the image processing apparatus 100, will be explained first in detail with reference to FIGS. 8–12, and operation as a whole will then be described with reference to FIG. 5 which more specifically shows the image processing apparatus 100.

The secondary line feature indicative value calculating means 116 calculates a primary line feature indicative value hx(a, b) defined by Equation (2) below along a plurality of lines in different directions and passing the target pixel P(a, b) so that "it detects a density peak (rising up and then descending) or a density trough (descending and then rising) thereof when a density profile is taken along all directions other than the direction of the line itself", which is characteristic to a line. The secondary line feature indicative value calculating means 116 then calculates the secondary line feature indicative value defined by Equation (1) based on all results of the calculation along the directions so that it does not mistake a corner of a tone image area for a line by distinguishing pixels composing the corner from a pixel composing a line. It is based on the fact that "since the primary line feature indicative value hx(a,b) becomes 0 when the density profile is taken along the direction of the line itself while it takes a large value along directions other than that, the detection of " the line feature"can be carried out by adopting and evaluating a value second-largest or smaller than that as the secondary line feature indicative value among the primary line feature indicative values".

$$H(a, b) = 2\text{nd\_Max\_Abs}_{x=1,4}\{hx(a, b)\} \quad (1)$$

where,
2nd_Max_Abs(E) indicates (either one of) element with a second-largest absolute value among all elements in set E.

$$hx(a, b) = \text{Max\_Abs}\left\{\text{Peak} \underset{ux}{\to} (a, b), \text{Trough} \underset{ux}{\to} (a, b)\right\} \quad (2)$$

where, $$\text{Max\_Abs}(X, Y) = \begin{cases} X & \text{if } |X| \geq |Y| \\ Y & \text{else} \end{cases}$$

$$pkx(a, b) = \text{Peak} \underset{ux}{\to} (a, b) \quad (3)$$

$$= \text{Max}\left(0, f(a, b) - \text{Max}\begin{pmatrix} \underset{k \in S+}{\text{Min}}\{f(a + k \cdot uxa, b + k \cdot uxb)\}, \\ \underset{k \in S-}{\text{Min}}\{f(a + k \cdot uxa, b + k \cdot uxb)\} \end{pmatrix}\right)$$

$$trx(a, b) = \text{Trough} \underset{ux}{\to} (a, b) \quad (4)$$

$$= \text{Min}\left(0, f(a, b) - \text{Min}\begin{pmatrix} \underset{k \in S+}{\text{Max}}\{f(a + k \cdot uxa, b + k \cdot uxb)\}, \\ \underset{k \in S-}{\text{Max}}\{f(a + k \cdot uxa, b + k \cdot uxb)\} \end{pmatrix}\right)$$

where, $$x = 1, 2, \ldots, 4: \vec{ux} = uxa\,\vec{i} + uxb\,\vec{j} = \begin{pmatrix} uxa \\ uxb \end{pmatrix} \text{ and}$$

$$\vec{u1} = \begin{pmatrix} 1 \\ 0 \end{pmatrix}, \vec{u2} = \begin{pmatrix} 1 \\ 1 \end{pmatrix}, \vec{u3} = \begin{pmatrix} 0 \\ 1 \end{pmatrix}, \vec{u4} = \begin{pmatrix} -1 \\ 1 \end{pmatrix}$$

$$S+ \subset [1, 2, \ldots, N];\ S- \subset [-1, -2, \ldots, -N];$$

N: positive integer

As is obvious from Equation (1), secondary line feature indicative value H(a, b) of the target pixel P(a, b) means that the target pixel P(a, b) is a pixel composing a line darker/brighter than its background if the value is positive/negative. Therefore, the larger/smaller the absolute value of the secondary line feature indicative value H(a, b) of the target pixel P(a, b) is, the more likely the value shows the likelihood of a binary image area/tone image area. In an area where density is almost flat as is the case for a tone image area, the secondary line feature indicative value H(a, b) takes a value close to 0, which means that a line is hardly visible or does not exist. Hereinafter, the secondary line feature indicative value H(a, b) will be described in detail.

A characteristic of the primary line feature indicative value hx(a, b) of the target pixel P(a, b) will be explained first. Equation (2) above precisely defines the primary line feature indicative value hx(a, b). The primary line feature indicative value enables detection of a line regardless of the thickness thereof, if a characteristic of a line, that is, "a peak or a trough in a line density profile along all directions other than the direction of the line itself" is detectable in a reference area. Hereinafter, the line detection will be explained with reference to a simple example.

FIG. 8 explains the line detection by the primary line feature indicative value hx(a, b) in the case where a line (whose density is B) exists in a reference area of a predetermined size surrounding a target pixel P(a, b) composing the line on an original whose background density is A (B>A). (In the figure, suffixes showing the positions of the pixels are not shown. The same applies for FIGS. 9–12) The size of the reference area can be appropriately changed in response to the width of a line to be detected.

As shown in FIG. 8A, a density profile (FIG. 8B) is taken along the line passing the target pixel P(a, b) and going from lower left to the upper right (45°), and the primary line feature indicative value hx(a, b) (FIG. 8C)is calculated as follows:

(1) Maximal and minimal values on the left and the right of the target pixel P (a, b) are calculated respectively. In the example,
   the maximal value on the left=B
   the minimal value on the left=A
   the maximal value on the right=B
   the minimal value on the right=A (2) A maximal value among the minimal values having been found in the right and left is found. In the example above, it is A.

(3) A minimal value among the maximal values having been found in the right and left is found. In the example above, it is B.

(4) The difference between the density B of the target pixel P(a, b) and the maximal value among the minimal values in the right and left found in (2) is calculated to produce a pkx(a, b). If the difference is not 0, it means that the line has "a peak", that is, "a dark line exists on a bright background". The difference shows the density of the line (the density difference from the background density). In the example above, it is B−A.

(5) The difference between the density B of the target pixel P(a, b) and the minimal value among the maximal values in the right and left found in (2) is calculated to produce a trx(a, b). If the difference is not 0, it means that the line has "a trough", that is, "a bright line exists on a dark background". The difference shows the density of the line (the density difference from the background density). In the example, it is 0.

(6) The pkx(a, b) or trx(a, b) found through (4) and (5) which has the larger absolute value is adopted as the primary line feature indicative value hx(a, b) of the target pixel P(a, b). In this case, it is B−A.

The (4) above corresponds to Equation (3), (5) above to Equation (4), and (6) above to Equation (2).

As has been described above, if the target pixel P(a, b) is a pixel composing a line, a peak or a trough of density is detected. Therefore, the primary line feature indicative value hx(a, b) takes a value larger than 0, and the target pixel P(a, b) is recognized as a portion of line pixels.

FIG. 9 explains what value the primary line feature indicative value hx(a, b) takes if the target pixel P(a, b) is located around an edge of a tone image area. Along a direction X passing the target pixel P(a, b) and going from the lower left to the upper right, the primary line feature indicative value hx(a, b) of the target pixel P(a, b) is calculated from a density profile in FIG. 9B, as in (1) through (6) described for FIG. 8. The value is 0 (FIG. 9C).

As described above, when the target pixel P(a, b) is located around an edge of a tone image area, only either density rise or descent is observed in a reference area. Therefore, the primary line feature indicative value hx(a, b) will take a value close to 0 (in the above example, 0), and the target pixel P(a, b) is recognized as not a portion of line pixels, that is, a pixel in a tone image area.

A characteristic of the secondary line feature indicative value of the target pixel P(a, b) will be described next. The above Equation (1) precisely defines the secondary line feature indicative value H(a, b). Along 4 directions passing the target pixel P(a, b) and measured from the main scanning direction, wherein a direction 1 is vertical ($-90°$), a direction 2 is diagonal to the lower right ($-45°$), a direction 3 is horizontal ($0°$), and a direction 4 is diagonal to the upper right ($+45°$), the primary line feature indicative value hx(a, b) (X=1, 2, 3 and 4) where X stands for the directions above are calculated, and the value whose absolute value is second-largest is selected as the secondary line feature indicative value.

Figures 10A, 10B:
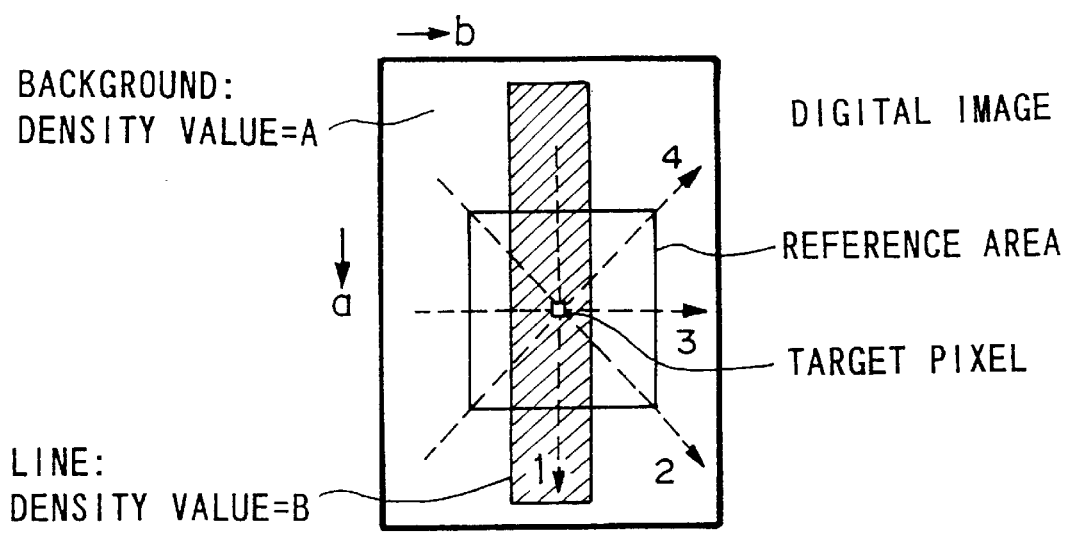
FIGS. 10A and 10B are diagrams showing detection of a line by a secondary line feature indicative value.

FIG. 10 explains what values the primary line feature indicative value hx(a, b) and the secondary line feature indicative value H(a, b) take in the case where a line (whose density is B) exists in a reference area of a predetermined size surrounding a target pixel P(a, b) composing the line on an original whose background density is A (B>A), as in FIG. 8. In this example, a primary line feature indicative value h1(a, b) is 0 along the direction 1, while other primary line feature indicative values hx(a, b) show B−A. Therefore, the secondary line feature indicative value H(a, b) is B−A.

Figures 11A, 11B:
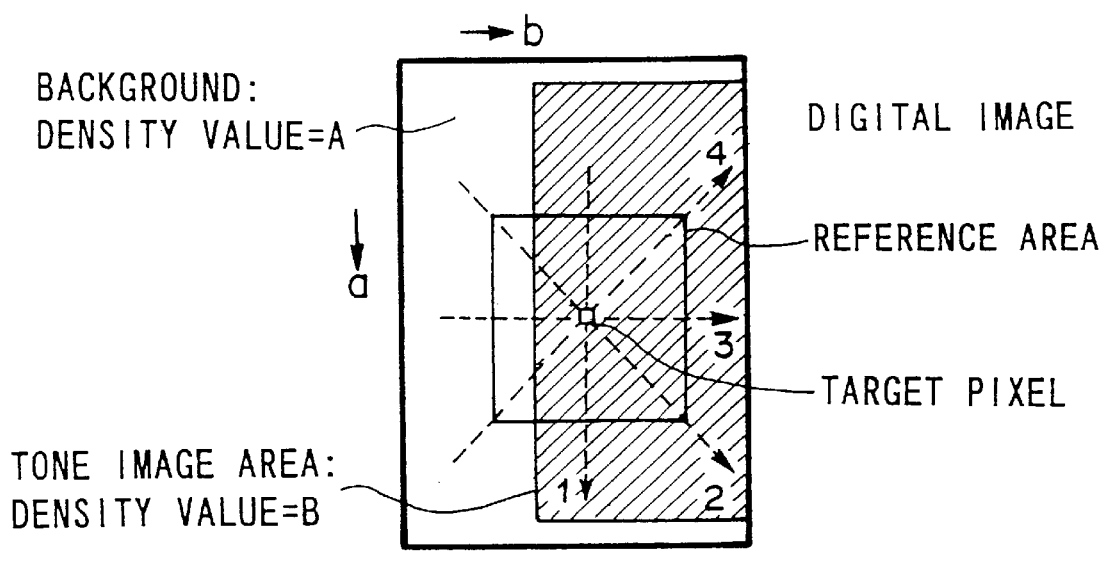
FIGS. 11A and 11B are diagrams showing how the secondary line feature indicative value works around an edge of a tone image area.

FIG. 11 explains what value the primary and the secondary line feature indicative values will take when the target pixel P(a, b) is located around an edge of a tone image area, as in FIG. 9. In this example, along each direction, the primary line feature indicative value is 0 and thus, the secondary line feature indicative value is also 0.

As has been described above, the secondary line feature indicative value H(a, b) shows the same characteristic as the primary line feature indicative value hx(a, b). Therefore, detection of a line can be performed by using the secondary line feature indicative value H(a, b). Furthermore, the secondary line feature indicative value has a characteristic such that a portion around an edge of a tone image area is not misjudged as a line.

Figures 12A, 12B:
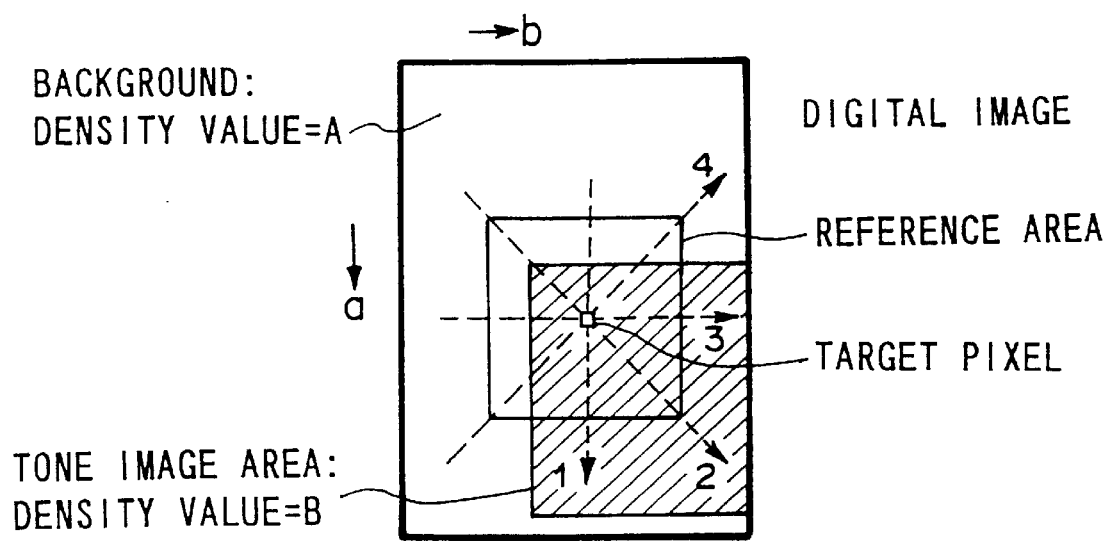
FIG. 12 is a diagram showing how the secondary line feature indicative value works around a corner of a tone image area.

FIG. 12 explains what values the primary and the secondary line feature indicative values will take in the case where the target pixel P(a, b) is located around a corner of a tone image area. In this example, along the direction 4, a primary line feature indicative value h4 (a, b) becomes B−A, while other primary line feature indicative values hx(a, b) are 0. Therefore, the secondary line feature indicative value H(a, b) is 0. In other words, according to the secondary line feature indicative value H(a, b), a portion around an edge of a tone image area is properly recognized as a tone image area, rather than a line.

As has been described above, the secondary line feature indicative value H(a, b) has a characteristic such that a portion around an edge of a tone image area is not recognized as a line, as well as the characteristic described above. Therefore, when the target pixel P(a, b) is located around a corner of a tone image area, there is only one direction along which the primary line feature indicative value hx(a, b) becomes large (in the above example, the direction 4), and thus the secondary line feature indicative value H(a, b) takes a value close to 0 (in the above example, 0). The target pixel P(a, b) is then properly recognized as a tone image pixel.

In FIGS. 10–12 described above, 4 directions are taken as has been described, based on consideration of the fact that general originals are often placed in an orientation wherein sides of a tone image area are almost parallel to the scanning directions. However, the directions and the numbers thereof for calculating the primary line feature indicative value are not necessarily limited to those in the example above. They may be 5 or more, for example. Furthermore, the absolute value to be selected as the secondary line feature indicative value is not necessarily the second-largest one, but the third-largest one or even smaller than that can be selected. In this case, in order not to mistake a corner of a tone image area for a line, it is necessary to determine which place of magnitude of an absolute value is selected in connection with the magnitude of angles and the directions of the angles, and with the directions and the number of the directions for calculating the primary line feature indicative value. In summary, any one of the above by which "a corner of a tone image area not being mistaken as a line" is achieved can be adopted.

Figure 5:
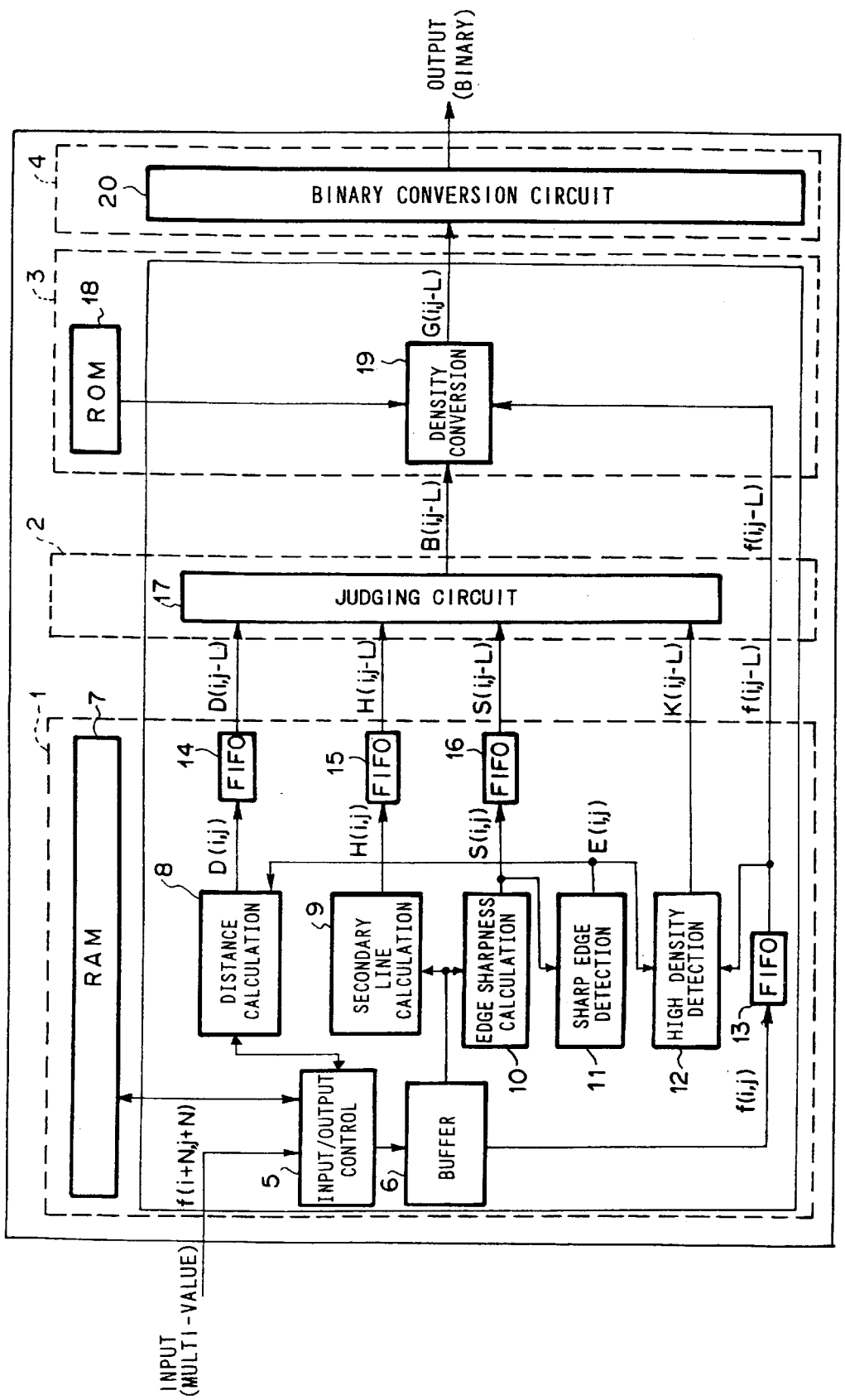
FIG. 5 is a block diagram showing the detail of the image processing apparatus.

Operation of the image processing apparatus 100 will be explained next with reference to FIG. 5. FIG. 5 is a block diagram which more specifically shows the image processing apparatus 100 shown in FIGS. 1 and 2.

Each element in each means 1, 2, 3, and 4 shown by broken lines in FIG. 5 realizes the analyzing means 110, the judging means 122, the adopted-density conversion means 124, and the binary conversion means 130 respectively (hereinafter, the same names as in FIG. 1 will be used). Each circuit 8, 10, 11, and 12 in analyzing means 1 realizes the distance calculating means 114c, the edge sharpness calculating means 114a, the sharp edge detecting means 114b, and the high density vertical line detecting means 114 d respectively, all of which compose the first analyzing means 114 shown in FIG. 2. 9 is a secondary line feature indicative value calculating circuit which realizes the secondary line feature indicative value calculating device 116. A RAM 7 and an image data buffer 6, both in the analyzing means 1, are the circuits which realize the data storage means 112. An input/output controlling means 5 in the analyzing means 1 outputs a density signal f carrying the density value input from an original reading means which is not shown in FIG. 5 to the RAM 7, and controls input/output of the data in the RAM 7 and the image data buffer 6.

The image processing apparatus 100 repeats the same processing on the input density value f for every pixel (or the density signal f; other feature indicative values which will be described later may also be called "** signal"). Therefore the following explains the processing which is carried out when feature indicative values of a target pixel P(i, j−L) are calculated.

Figure 4:
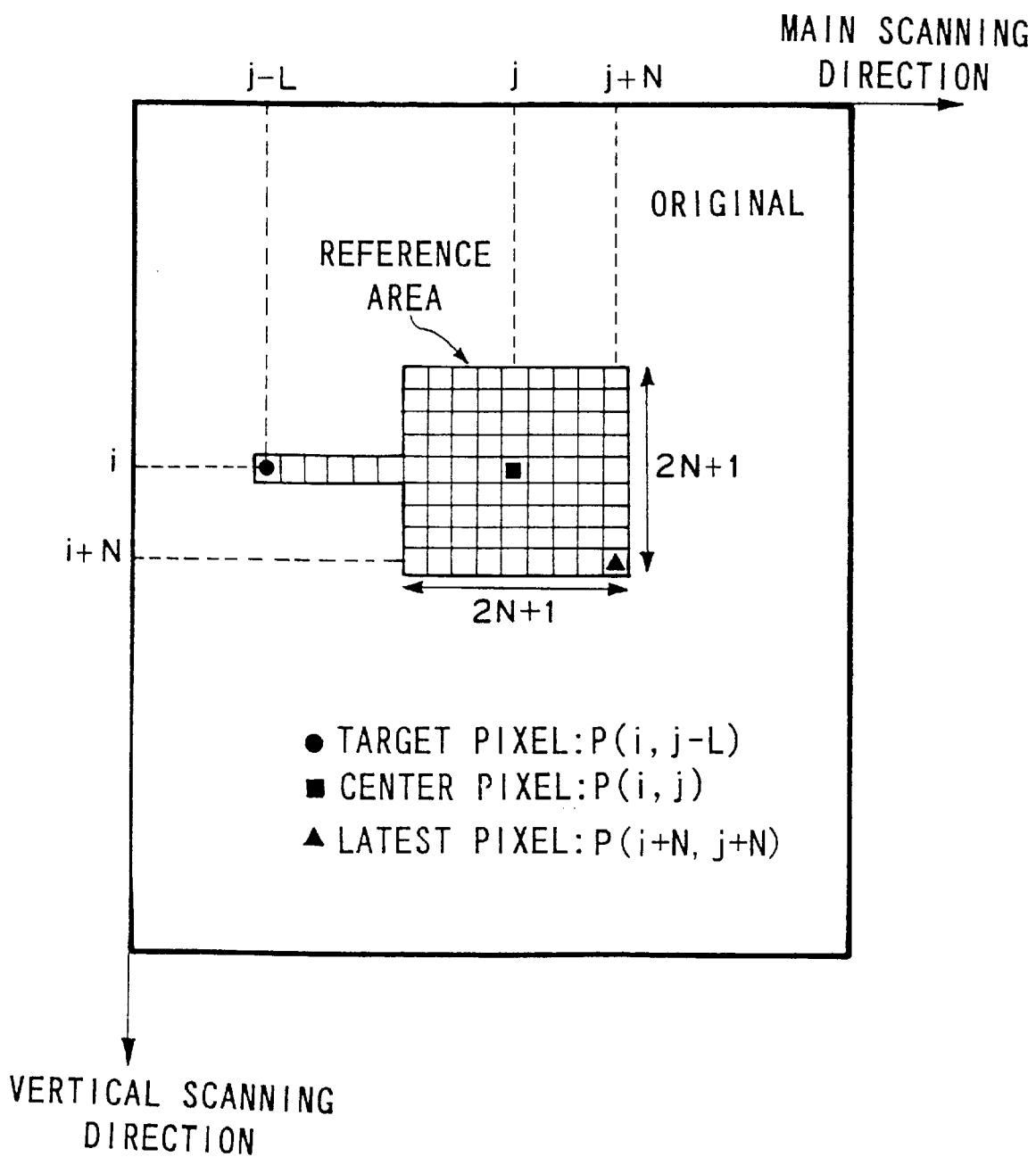
FIG. 4 is a diagram showing relative positions of a target pixel, a center pixel and a latest pixel.

FIG. 4 shows the relation among the density signals f of the target pixel P(i, j−L) which is a target of the processing, a center pixel P(i, j) which is located at the center of a reference area, and a latest pixel P(i+N, j+N) which is about to be input to the image processing apparatus 100 when the target pixel and the center pixel are about to be processed. The suffixes in the parentheses show the pixel numbers along the main and vertical scanning directions. The reason why the pixel positions of the target pixel P(i, j−L) and the center pixel P(i, j) differ by L along the main scanning direction is that a feature indicative value K can only be found by a high density vertical line detecting circuit 12 only when the target pixel position is behind a pixel position for finding other feature indicative values by L.

(1) Processing Flow in the Analyzing Means 1

When a density signal f(i+N, j+N) of the latest pixel P(i+N, j+N) is input in the image processing apparatus, the input/output controlling circuit 5 reads from the RAM 7 an edge sharpness indicative value S(i, j) at the center pixel P(i, j), data necessary for the image data buffer 6 (hereinafter called "latest image data for the image data buffer"), and distance signals D(i−1, j), D(i−1, j+1) and D(i, j−1) which will be necessary for calculating a distance D(i, j) from a sharp edge pixel closest to the target pixel. The distance signals D(i−1, j) and the like having been read and the density value of the latest pixel are input to the image data buffer 6, while the distance signals D(i−1, j) and the like having been read are sent to a distance calculating circuit 8 for calculating distance from the closest sharp edge (hereinafter called "the distance calculating circuit 8"). The input/output controlling circuit 5 overwrites a density value f(i−N, j+N) having been stored in the RAM 7 with the density value f(i+N, j+N) of the latest pixel.

Figure 6:
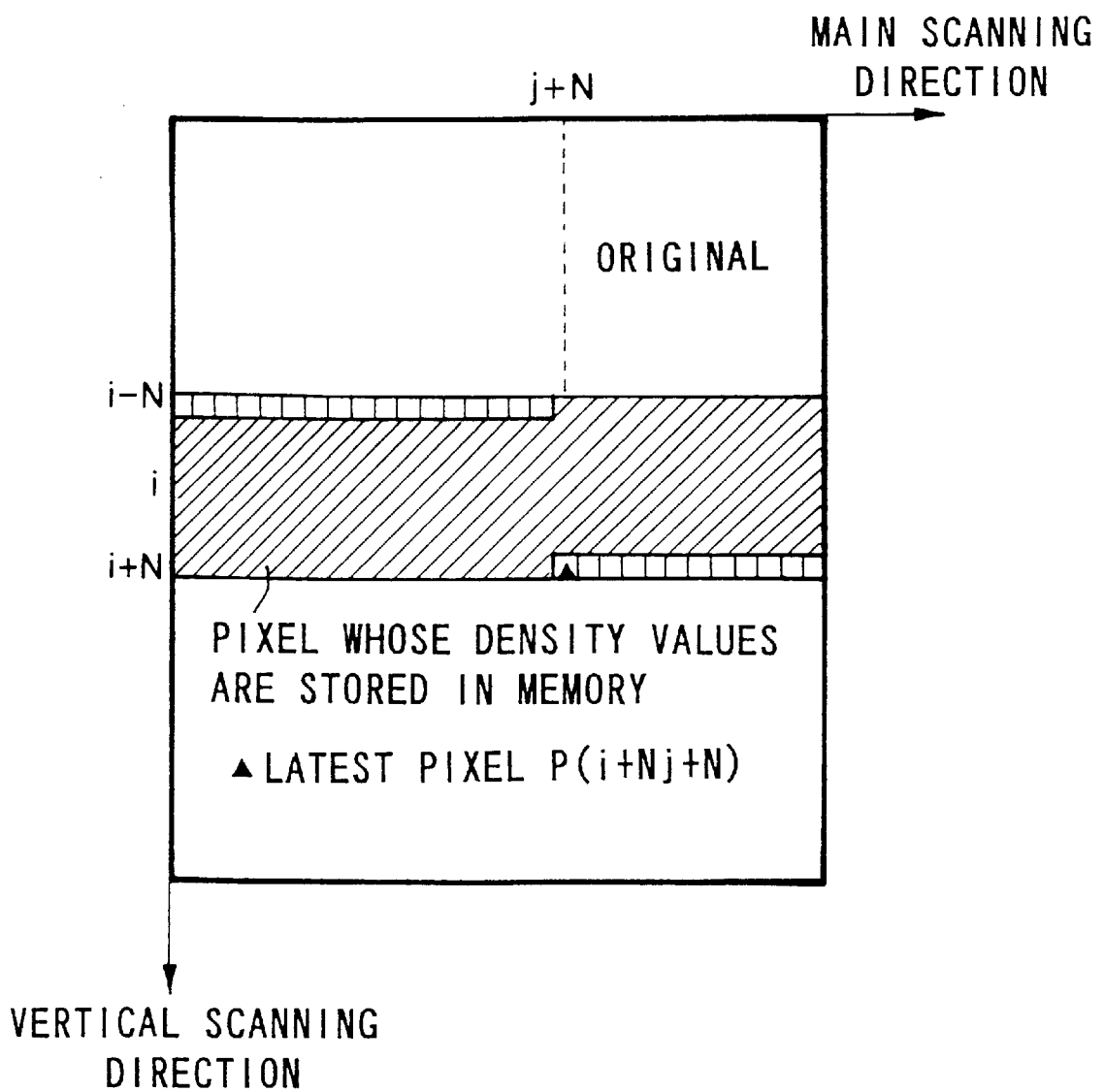
FIG. 6 is a diagram showing positions on an original of pixels corresponding to image density signals stored in a memory.
Figure 7:
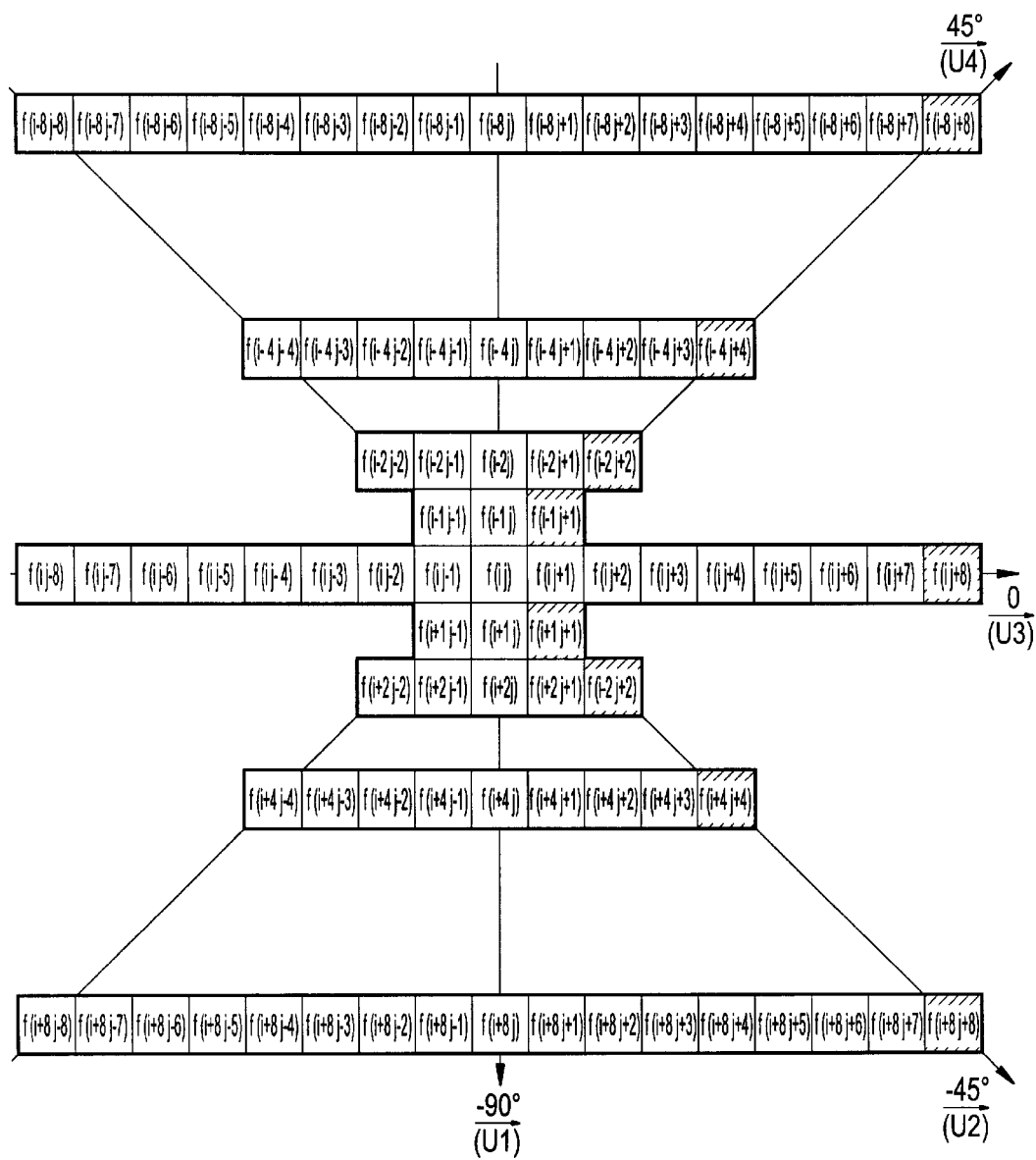
FIG. 7 is a diagram showing an example of data to be stored in an image data buffer (when N=8, S+={1,2,4,8}, and S−={−1, −2, −4, −8})

FIG. 6 shows image data representing density values having been stored in the RAM 7 before the density value f(i+N, j+N) of the latest pixel is stored therein. FIG. 7 shows image data stored in the image data buffer 6 when N=8, S+={1, 2, 4, 8}, S−={−1, −2, −4, −8}, and the directions x for calculating the secondary line feature indicative value= 0°, 45°, −90°, and −45°.

In FIG. 7, f(i+8, j+8) is the density signal of the latest pixel, f(i−8, j+8), f(i−4, j+4), f(i−2, j+2), f(i−1, j+1), f(i, j+8), f(i+1, j+1), f(i+2, j+2), and f(i+4, j+4) are the latest image data for the image data buffer. The image data buffer 6 is configured so that each line thereof has a shift register. In this example, discrete numbers "1, 2, 4 and 8", are used as the elements of S+ and numbers "−1, −2, −4 and −8" are used as the elements of S− in order to enhance the speed of calculation for finding the secondary line feature indicative value. However, consecutive integers may be used instead.

After the secondary line feature indicative value calculating circuit 9 calculates the secondary line feature indicative value H(i, j) defined by Equation (1) by using the image data having been stored in the image data buffer 6 (see FIG. 7) in the same manner described with reference to FIGS. 10 to 12, the secondary line feature indicative value H(i, j) is input to a delay circuit (FIFO) 15.

The edge sharpness calculating circuit 10 carries out convolution by using an edge detecting filter (an edge detecting coefficient matrix) having directivity in 4 directions, i. e., vertical (−90°), diagonal to the lower right (−45°), horizontal (0°), and diagonal to the upper right (45°) as noted in Equation (5) in order to detect edges having 4 directions, namely −90°, −45°, 0°, and 45°. Among the 4 edge sharpness values having been found, the largest value becomes the edge sharpness indicative value S(i, j) defined by Equation (5) (see Japanese Unexamined Patent Publn. No. 8 (1996)-51538). After the edge sharpness indicative value S(i, j) defined by Equation (5) has been found by the edge sharpness calculating circuit 10, S(i, j) is input to FIFO 16.

$$S(a, b) = \max_{m=1,4}\{|f * g_m(a, b)|\} \quad (5)$$

where, $$f * g_m(a, b) = \sum_{k=-1}^{l} \sum_{l=-1}^{l} g(k, l) \times f(a+k, b+l) \text{ (m is a suffix)}$$

The matrix $4 \cdot g_m$ (k,l) which is a multiple of $g_m$ (k,l) by 4 is as follows:

$$4 \cdot g_1(k, l): \begin{bmatrix} -1 & -1 & -1 \\ 0 & 0 & 0 \\ 1 & 1 & 1 \end{bmatrix} \quad 4 \cdot g_2(k, l): \begin{bmatrix} 0 & 1 & 1 \\ -1 & 0 & 1 \\ -1 & -1 & 0 \end{bmatrix}$$

$$4 \cdot g_3(k, l): \begin{bmatrix} -1 & 0 & 1 \\ -1 & 0 & 1 \\ -1 & 0 & 1 \end{bmatrix} \quad 4 \cdot g_4(k, l): \begin{bmatrix} -1 & -1 & 0 \\ -1 & 0 & 1 \\ 0 & 1 & 1 \end{bmatrix}$$

The edge sharpness indicative value S(i, j) shows that the sharper (duller) the edge of the center pixel P(i, j) is, the more likely the center pixel P(i, j) is a character contour pixel (a tone image pixel).

The sharp edge detecting circuit 11 calculates a sharp edge detecting feature indicative value E(i, j) defined by Equation (6) by using the edge sharpness signal S(i, j), and sends E(i, j) to both the distance calculating circuit 8 and the high density vertical line detecting circuit 12. The sharp edge detecting feature indicative value E(i, j) defined by Equation (6) becomes true if the edge sharpness indicative value S(i, j) exceeds a predetermined threshold value.

$$E(a, b) = (S(a, b) > T_1) \quad (6)$$

The distance calculating circuit 8 calculates distance D(i, j) from the sharp edge pixel closest to the center pixel P(i, j) defined by Equation (7) by using D(i−1, j), D(i−1, j+1), and D(i, j−1) read by the input/output controlling circuit 5 and the sharp edge detecting feature indicative value E(i, j) having been calculated. The distance calculating circuit 8 then sends D(i, j) to the input terminal of FIFO 14 and the input/output controlling circuit 5. The input/output controlling circuit 5 overwrites D(i−1, j) having been stored in the RAM 7 with D(i, j).

Equation (7) shows a distance between the center pixel and a pixel closest to the center pixel with a sharp edge having been read before the center pixel is read. Equation (7) provides an approximation method which enables simple hardware to carry out the calculation using Equation (7) (see Japanese Unexamined Patent Publn. No. 8(1996)-51538).

$$D(a, b) = \begin{cases} 0 \text{ if } E(a, b) \\ \text{Min}(D(a-1, b), D(a-1, b+1), D(a, b-1)) + 1 \text{ else} \end{cases} \quad (7)$$

The shorter the distance D(i, j) from the closet sharp edge pixel is to the center pixel P(i, j), the more likely the center pixel is in a character image area, and the longer the distance is, the more likely the center pixel is in a tone image area.

The high density vertical line detecting circuit 12 calculates the high density vertical line detecting feature indicative value K(i, j–L) at a target pixel P(i, j–L) defined by Equation (8) by using the sharp edge detecting feature indicative value E(i, j) and the density value f(i, j–L) of the target pixel P(i, j–L) output from FIFO 13 which delays the density value f(i, j) of the center pixel P(i, j) by L pixels. The high density vertical line detecting circuit 12 then sends K(i, j–L) to a judging circuit 17. The high density vertical line detecting feature indicative value K(i, j–L) shows a judgment result as to whether or not the target pixel P(i, j–L) is on a high-density and comparatively thick vertical line (a line parallel to the vertical scanning direction) on an original. The high density vertical line detecting feature indicative value K(i, j–L) shows that the target pixel is a pixel on the high density vertical line if three conditions are met: the density of the target pixel P(i, j–L) itself is high to some degree; at least a pixel with a sharp edge exists among the pixels within a certain distance from the target pixel P(i, j–L) along the main scanning direction; and the pixel immediately proceeding the target pixel P(i, j–L) is a pixel showing a sharp edge or in a high density vertical line (see Japanese Unexamined Patent Publn. No. 8(1996)-51538). Therefore, when a high density vertical line is detected at the target pixel P(i, j–L), it is highly likely that the line is a dark vertical line composing a character.

$$K(a, b) = \begin{pmatrix} (f(a, b) > T_2) \text{ AND} \\ (E(a, b+1) \text{ OR } E(a, b+2) \text{ OR } ... \text{ OR } E(a, b+L)) \text{ AND} \\ (E(a, b-1) \text{ OR } K(a, b-1)) \end{pmatrix} \quad (8)$$

The FIFOs 14, 15, and 16 respectively delay the distance signal D(i, j) showing the distance from the closest sharp edge pixel, the secondary line feature indicative value H(i, j), and the edge sharpness signal S(i, j) at the center pixel P(i, j) by L pixels so that the position of these values at the center pixel matches with the pixel position of the feature indicative value K(i, j–L) at the target pixel P(i, j–L). The FIFOs then send the signals D(i, j–L), H(i, j–L), and S(i, j–L) at the target pixel P(i, j–L) to the judging circuit 17 which judges the number of the appropriate density conversion curve.

(2) Processing Flow in the Judging Means 2

The judging circuit 17 judges the state of the target pixel P(i, j–L) by a grade ranging from a binary image to a tone image. The judging circuit 17 finds a selecting signal B(i, j–L) which selects the number of a gamma curve (a density conversion curve) defined by Equation (9) and appropriate for the state of the target pixel P(i, j–L) by using the signals having been fount as described above, namely D(i, j–L), H(i, j–L), S(i, j–L), and K(i, j–L), all of which characterize the state of the target pixel P(i, j–L). The judging circuit 17 then sends the selecting signal B(i, j–L) to a density conversion circuit 19 which converts density by selecting the density conversion curve in response to the selecting signal B(i, j–L).

$$B(a, b) = \begin{cases} \text{if } ((S(a, b) > T3) \text{ OR } (K(a, b))) : 0 \\ \text{else if } (H(a, b) > T4) : 1 \\ \text{else if } (H(a, b) > T5) : 2 \\ \text{else if } (H(a, b) > T6) : 3 \\ \text{else if } (H(a, b) < T7) : 4 \\ \text{else if } (H(a, b) < T8) : 5 \\ \text{else if } (H(a, b) < T9) : 6 \\ \text{else if } (H(a, b) < T10) : 7 \\ \text{else if } (H(a, b) < T11) : 8 \\ \text{else if } (H(a, b) < T12) : 9 \\ \text{else} : 10 \end{cases} \quad (9)$$

For the value of the selecting signal B(i, j–L), threshold values T3~T12 have been set so that a desired density conversion curve for each pixel can be selected by the density conversion circuit 19 through consideration of the characteristics such that.

1. an edge pixel mainly exists in a binary image area;
2. the sharper (larger) the edge (density difference) is, the more likely the pixel is in a binary image area, and the duller (smaller) the edge (density difference) is, the more likely the pixel is in a tone image area;
3. when a line segment which catches the target pixel between an edge pixel thereon with a density rise and an edge pixel thereon with a density descent along the main or vertical scanning direction exists, the line is highly likely to be a line (a portion of a binary image) composing a character if the density of the line is high and the line is thin;
4. the shorter the distance from the target pixel to the edge pixel closest to the target pixel is, the more likely the target pixel is in a character image, while the longer the distance is, the more likely the pixel is in a tone image area; and
5. when a secondary line feature indicative value of the target pixel is detected, a line on the pixel has a density higher (or lower) than the background, and the larger the value is, the larger the density difference is.

More specifically, the selecting signal B(i, j–L) means: a binary image if B(i, j–L)=0;
a line in much higher density than the background density if B(i, j–L)=1;
a line in higher density than the background density if B(i, j–L)=2;
a line in slightly higher density than the background density if B(i, j–L)=3;
a line in much lower density than the background density if B(i, j–L)=4;
a line in lower density than the background density if B(i, j–L) =5;
a line in slightly lower density than the background density if B(i, j–L)=6;
likelihood of a binary image if B(i, j–L)=7;
an image which is hard to be judged whether it is a binary image or it is a tone image if B(i, j–L)=8;
likelihood of a tone image if B(i, j–L)=9; and
a tone image if B(i, j–L)=10.

(3) Processing Flow in a Density Conversion Means 3

A ROM 18 which is connected to the density conversion circuit 19 stores adopted-density conversion data G(i, j–L) corresponding to the density conversion curves in response to each of the selecting signal B(i, j–L).

The density conversion circuit 19 reads the density conversion data G(i, j–L) defined by Equation (10) and having been stored in the ROM 18, by using the selecting signal B(i, j–L) which is appropriate for the state of the target pixel P(i, j–L) and the density value f(i, j–L) of the target pixel P(i, j–L). The density conversion circuit 19 sends G(i, j–L) to a binary conversion circuit 20.

$$G(a,b) = \Gamma_{B(a,b)}[f(a,b)] \quad (10)$$

More specifically, the density conversion circuit 19 carries out the density conversion in accordance with one of 11 density conversion curves, as shown in FIG. 13. The density conversion curves comprise a density conversion curve 21 for a binary image area which carries out binary conversion of input density into either a maximal or a minimal value, a density conversion curve 25 for a tone image area which preserves tone characteristics of input density in output density, 3 density conversion curves for interpolation among which are a density conversion curve 22 which interpolates the above two curves and closer to the density conversion curve 21 for a binary image area, a density conversion curve 24 which is closer to the density conversion curve 25 for a tone image area, and a density conversion curve 23 which has a characteristic of a half tone of the density conversion curves 22 and 24, density conversion curves 26 (for big peaks), 27 (for intermediate peaks), and 28 (for small peaks) which smoothly transform the density conversion curve 25 for a tone image area to respectively produce extremely/intermediately/slightly higher density than the density conversion curve 25 as a whole, and density conversion curves 29 (for small troughs), 30 (for intermediate troughs), and 31 (for big troughs) which smoothly transform the density conversion curve 25 for a tone image area to respectively produce slightly/intermediately/extremely lower density than the density conversion curve 25 as a whole.

Therefore, in response to the selecting signal B(i, j–L) from the judging circuit 17, the density conversion circuit 19 selects one of the above density conversion curves according to the following rule:

if B(i, j–L)=0, select the density conversion curve 21 for a binary image area;
if B(i, j–L)=1, select the density conversion curve 26 for big peaks;
if B(i, j–L)=2, select the density conversion curve 27 for intermediate peaks;
if B(i, j–L)=3, select the density conversion curve 28 for small peaks;
if B(i, j–L)=4, select the density conversion curve 31 for big troughs;
if B(i, j–L)=5, select the density conversion curve 30 for intermediate troughs;
if B(i, j–L)=6, select the density conversion curve 31 for small troughs;
if B(i, j–L)=7, select the density conversion curve 22 which interpolates the two density conversion curves and closer to the density conversion curve 21 for a binary image area;
if B(i, j–L)=8, select the density conversion curve 23 which has a characteristic of a half tone of the density conversion curves 22 and 24;
if B(i, j–L)=9, select the density conversion curve 24 which interpolates the two density conversion curves and closer to the density conversion curve 25 for a tone image area; and
if B(i, j–L)=10, select the density conversion curve 25 for a tone image area. The density conversion circuit 19 then carries out the density conversion according to the selected density conversion curve for the density signal f(i, j–L), and outputs the adopted-density conversion data G(i,j–L).

(4) Processing Flow in the Binary Conversion Means 4

The density value G(i, j–L) of the target pixel P(i, j–L) having been appropriately density-converted by the density conversion circuit 19 is input to the binary conversion circuit 20 wherein the value is binary-converted in a manner based on the error diffusion method, and binary image data appropriate for stencil printing are output.

In this manner, a faint letter comprising thin lines can be reproduced appropriately and a gap between character strokes can also be reproduced more clearly by selecting a density conversion curve 26, 27, or 28 (29, 30, or 31) which produces higher (lower) density as a whole than the density conversion curve 25 for a tone image area, in response to the magnitude of the secondary line feature indicative value showing a dark (bright) line. Furthermore, by making a dark line darker and a bright line brighter, a mesh dot picture comprising fine dots is prevented from becoming too dark or too faint.

In this manner, according to the image processing apparatus of the present invention, tone characteristics of a tone image area can be preserved by judging the state of the image based on the secondary line feature indicative value, and problems of blur or extinction of faint letters can be solved by appropriately strengthening or weakening the contrast of the letters even when the density of the letters varies.

Since the analyzing means 1 shown in FIG. 5 combines the feature indicative value calculating circuits 8, 10, 11, and 12 which are similar to those of an image processing apparatus disclosed in Japanese Unexamined Patent Publn. No. 8(1996)-51538 and the secondary line feature indicative value calculating circuit 9, and the density conversion circuit 19 uses the output from the feature indicative value calculating circuits 8, 10, 11, and 12 for judgment, more appropriate density conversion in response to the state of an image becomes possible. By selecting the density conversion curve 22 or 23 closer to the density conversion curve 21 for a binary image area when the target pixel is closer to an edge, and by selecting the density conversion curve 24 or 23 closer to the density conversion curve 25 for a tone image area when the target pixel is farther from an edge, letters in thick lines and a flatly blackened area are made to look more conspicuously dark as by the image processing apparatus in Japanese Unexamined Patent Publn. No. 8(1996)-51358, and tone characteristics of a tone image area in high density can be preserved.

By combining the image processing apparatus of the present invention with density conversion processing by a conventional image processing apparatus as in the embodiment above, effects caused by judging the state of an image based on the secondary line feature indicative value is added to the effects by the conventional apparatus. It is also possible to carry out an appropriate density conversion by judging the state of an image solely based on the secondary line feature indicative value.

What is claimed is:

1. An image processing apparatus comprising:
   first analyzing means which analyzes whether a target pixel is likely to be in a binary image area or in a tone image area;
   second analyzing means different from said first analyzing means, which analyzes whether the target pixel is likely to be in a binary image area or a tone image area by calculating, based on reference image data around the target pixel, a plurality of degrees of at least either a peak or a trough of the target pixel density as primary line feature indicative values along a plurality of corresponding lines in different directions and passing the target pixel, and calculating a secondary line feature indicative value based on the primary line feature indicative values having been calculated; and density conversion means which converts the density of the target pixel based on the analysis result by said first and second analyzing means.

2. The image processing apparatus as claimed in claim 1, wherein the second analyzing means determines in advance which place in the absolute value of the primary line feature indicative values should be extracted as the secondary line feature indicative value in connection with a predetermined angle and the number of lines in different directions, and outputs the determined primary line feature indicative value as the secondary line feature indicative value of the target pixel.

3. The image processing apparatus as claimed in claim 2, wherein when pixels on the line of said reference image data are divided into two groups which catch the target pixel therebetween, the degree shows the magnitude of the absolute value of the density difference between the target pixel and one of the group of pixels with the smaller density difference from the density of the target pixel.

4. The image processing apparatus as claimed in claim 3, wherein the secondary line feature indicative value is calculated according to Equation (1):

$$H(a, b) = 2\text{nd\_Max\_Abs}_{x=1,4}\{hx(a, b)\} \quad (1)$$

where,

2nd_Max_Abs(E) indicates (either one of) element with a second-largest absolute value among all elements in set E.

$$hx(a, b) = \text{Max\_Abs}\left\{\text{Peak}_{\overrightarrow{ux}}(a, b), \text{Trough}_{\overrightarrow{ux}}(a, b)\right\} \quad (2)$$

$$\text{where, Max\_Abs}(X, Y) = \begin{cases} X & \text{if } |X| \geq |Y| \\ Y & \text{else} \end{cases}$$

$$pkx(a, b) = \text{Peak}_{\overrightarrow{ux}}(a, b) = \quad (3)$$

$$\text{Max}\left(0, f(a, b) - \text{Max}\begin{pmatrix} \min_{k \in S+}\{f(a + k \cdot uxa, b + k \cdot uxb)\}, \\ \min_{k \in S-}\{f(a + k \cdot uxa, b + k \cdot uxb)\} \end{pmatrix}\right)$$

$$trx(a, b) = \text{Trough}_{\overrightarrow{ux}}(a, b) = \quad (4)$$

$$\text{Min}\left(0, f(a, b) - \text{Min}\begin{pmatrix} \max_{k \in S+}\{f(a + k \cdot uxa, b + k \cdot uxb)\}, \\ \max_{k \in S-}\{f(a + k \cdot uxa, b + k \cdot uxb)\} \end{pmatrix}\right)$$

where, $$x = 1, 2, \ldots, 4 : \vec{ux} = uxa\ \vec{i} + uxb\ \vec{j} = \begin{pmatrix} uxa \\ uxb \end{pmatrix} \text{ and}$$

$$\vec{u1} = \begin{pmatrix} 1 \\ 0 \end{pmatrix}, \vec{u2} = \begin{pmatrix} 1 \\ 1 \end{pmatrix}, \vec{u3} = \begin{pmatrix} 0 \\ 1 \end{pmatrix}, \vec{u4} = \begin{pmatrix} -1 \\ 1 \end{pmatrix}$$

$$S+ \subset [1, 2\ldots, N] : S- \subset [-1, -2, \ldots, -N];$$

N: positive integer.

5. The image processing apparatus as claimed in any one of claims 1 to 4, wherein the density conversion means converts density by selecting an appropriate density conversion curve among a plurality of density conversion curves.

6. The image processing apparatus as claimed in any one of claims 1 to 4 comprising binary conversion means which carries out binary conversion by an error diffusion method on the target pixel having been density-converted.

7. A secondary line feature indicative value calculating device comprising; a first calculating means for calculating, based on reference image data around a target pixel, a plurality of degrees of at least either a peak or a trough of a target pixel density as primary line feature indicative values along a plurality of corresponding lines in different directions and passing the target pixel, and a second calculating means for calculating the secondary line feature indicative value based on the results of the calculated primary line feature indicative value.

* * * * *

UNITED STATES PATENT AND TRADEMARK OFFICE
CERTIFICATE OF CORRECTION

PATENT NO.      : 6,167,154                                       Page 1 of 1
DATED           : December 26, 2000
INVENTOR(S)     : Miel Renaud et al.

It is certified that error appears in the above-identified patent and that said Letters Patent is hereby corrected as shown below:

<u>Title page,</u>
Item [56], add the following References Cited:

-- [56]         References Cited

U.S. PATENT DOCUMENTS
| | | |
|---|---|---|
| 4,893,188 | 1/1990 | Murakami et al. |
| 4,903,316 | 2/1990 | Hongo et al. |
| 5,396,584 | 3/1995 | Lee et al. |

FOREIGN PATENT DOCUMENTS
| | | |
|---|---|---|
| 0415722A2 | 3/1991 | Europe |
| EO0719004A2 | 5/1996 | Europe |
| EP0415648A2 | 3/1991 | Europe |
| 0100811 | 2/1984 | Europe |
| 0234590 | 9/1987 | Europe -- |

Signed and Sealed this

Twenty-third Day of July, 2002

Attest:

Attesting Officer

JAMES E. ROGAN
*Director of the United States Patent and Trademark Office*